United States Patent [19]
Oh

[11] Patent Number: 5,974,554
[45] Date of Patent: Oct. 26, 1999

[54] COMPUTER SYSTEM WITH AUTOMATIC CONFIGURATION CAPABILITY FOR INDUSTRY STANDARD ARCHITECTURE (ISA) CARDS

[75] Inventor: Sang-Min Oh, Kyungui-do, Rep. of Korea

[73] Assignee: SamSung Electronics Co., Ltd., Kyungki-do, Rep. of Korea

[21] Appl. No.: 09/022,635

[22] Filed: Feb. 12, 1998

[30]     Foreign Application Priority Data

Feb. 14, 1997  [KR]    Rep. of Korea ...................... 97-04378

[51] Int. Cl.⁶ ........................................................ G06F 1/32
[52] U.S. Cl. .......................... 713/300; 713/320; 713/323; 713/330; 710/101; 710/102; 710/103; 710/104
[58] Field of Search ................................. 713/300, 320, 713/322, 323, 324, 330, 340; 710/59, 101, 102, 103, 104, 260

[56]         References Cited

U.S. PATENT DOCUMENTS

| | | | |
|---|---|---|---|
| 5,517,646 | 5/1996 | Piccirillo et al. | 395/651 |
| 5,559,965 | 9/1996 | Oztaskin et al. | 710/104 |
| 5,628,027 | 5/1997 | Belmont | 710/1 |
| 5,634,075 | 5/1997 | Smith et al. | 710/9 |
| 5,797,036 | 8/1998 | Kikinis | 710/38 |

*Primary Examiner*—L. Johnson
*Assistant Examiner*—Ario Etienne
*Attorney, Agent, or Firm*—Robert E. Bushnell, Esq.

[57]             ABSTRACT

A computer system with an advanced power management which includes a PnP compatible operating system, an ISA bus, and a system BIOS for searching a read data port for all PnP ISA devices, which is used to read information from the PnP ISA devices. The computer system is able to save and restore the resource configuration information of the PnP ISA devices into/from a non-volatile storage by use of the searched read data port during a suspend/resume mode of the advanced power management.

5 Claims, 5 Drawing Sheets

COMPUTER SYSTEM WITH AUTOMATIC CONFIGURATION CAPABILITY FOR INDUSTRY STANDARD ARCHITECTURE (ISA) CARDS

This application makes reference to, incorporates the same herein, and claims all benefits accruing under 35 U.S.C. §119 from an application for A COMPUTER SYSTEM WITH AUTOMATIC CONFIGURATION CAPABILITY TO INDUSTRY STANDARD ARCHITECTURE (ISA) CARDS earlier filed in the Korean Industrial Property Office on the of Feb. 14$^{th}$, 1997, and there duly assigned Ser. No. 4378/1997, a copy of which application is annexed hereto.

BACKGROUND OF THE INVENTION

1. Technical Field

The present invention relates to a computer system having the Industry Standard Architecture (ISA) bus, more particularly, to a computer system with the automatic configuration capability for the ISA cards and with so-called Advanced Power Management by which its power usage is controlled.

2. Related Art

Computer systems may be provided with provisions for adding devices thereto. For example, an ISA (Industry Standard Architecture) type personal computer system may be provided with expansion slots coupled to the ISA system bus for receiving expansion device cards which plug into such expansion slots. Other types of expansion techniques may also be used, such as PCI (Peripheral Component Interconnect) slots, PCMCIA (Personal Computer Memory Card Interface Association) slots, Micro Channel slots, EISA slots, orthelike. Examples of such expansion devices include keyboard controllers, hard drive controllers, floppy drive controllers, video controllers, modems, network cards, add-on memory cards, multimedia cards, sound cards, I/O devices, or the like. An expansion device may comprise one or more logical devices each of which may be assigned system resources such as an I/O address, interrupt level, and DMA channel.

The ISA bus is one of the popular expansion bus standards in the personal computer (PC) industry. The ISA bus requires the allocation of memory and I/O address spaces, DMA channels and interrupt levels among multiple ISA expansion cards. However, ISA does not define a hardware or software mechanism for allocating these resources. Consequently, configuration of ISA cards is typically done with switches or jumpers that change the decode maps for memory and I/O space and steer the DMA and interrupt signals to different pins on the bus. In addition, system configuration files need to be updated to reflect the configuration changes. When more than one expansion card is placed onto an ISA bus, conflicts may arise as a result of the different resource requirements of the expansion cards. To address these potential conflicts, users had to refer to instruction manuals provided by the expansion card manufacturers. From the user's perspective, the configuration process was time consuming and unreliable.

Automated expansion card configuration systems for automatically configuring newly installed expansion cards on standard ISA bus were recently developed. Examples of such configuration systems are disclosed in U.S. Pat. No. 5,517,646 for Expansion Device Configuration System Having Two Configuration Modes Which Uses Automatic Expansion Configutration Sequence During First Mode And Configures The Device Individually During Second Mode issued to Piccirillo et al., U.S. Pat. No. 5,559,965 for Input/Output Adapter Cards Having A Plug And Play Compliant Mode And An Assigned Resources Mode issued to Oztaskin et al., U.S. Pat. No. 5,628,027 for Method Of Determining The Configuration Of Devices Installed On A Computer Bus issued to Belmont, and U.S. Pat. No. 5,634,075 for Baclkward Compatibility For Plug And Play Systems issued to Smith et al. Computer systems that contain a standard bus conforming to the ISA standard may implement a Plug and Play specification, Version 1.0a", May 5, 1994 for automatically configuring Plug and Play expansion cards on the ISA bus without user intervention. The specification, which is incorporated by reference herein, defines a mechanism that provides automatic configuration capability for PnP ISA expansion cards with identification, resource usage determination, conflict detection, and conflict resolution.

In a first kind of PnP compatible ISA PC system, software stored in its ROM BIOS may configure a system after power up to assign system resources such as memory space, I/O addresses, interrupt levels, and DMA channels to each PnP ISA expansion card plugged in the system. The PnP ISA expansion cards built according to the PnP ISA specification may operate in conjunction with such software stored in the BIOS (i.e., PnP BIOS). In such a PC system, when power is applied to the system, PnP expansion cards required for system boot may become active on power up using power-up default system resources. Examples of the devices required for system boot may include hard and floppy disc drive controllers, keyboard controllers, display controllers or the like. Other PnP ISA devices not required for system boot may power up in an inactive state. Examples of PnP devices not required for system boot may include modems, sound cards, or the like. Such devices may not be required for system boot and initial loading of operating system and the like.

Then, the PnP BIOS may isolate each PnP device, assign a handle (i.e., Card Select Number) to each expansion card, and read the resource data from that card. Once each card had been isolated, assigned a handle and read, the PnP BIOS will check for conflict in the devices required for boot, and activate each boot device. The PC system may then boot, for example, from a hard drive and load and execute an operating system (e.g., MS-DOS®, WINDOWS®, OS/2®, UNIX®, or the like). Optionally, the BIOS may configure all other logical devices and configure or leave them in active state.

The operating system may then get PnP information from the ROM BIOS, read resource data from all PnP devices, and arbitrate system resources for all PnP devices. Conflict-free resources may then be assigned for all activated devices and the inactivated devices. Finally, appropriate device drivers may be loaded and thus the system is configured.

In another type of PnP compatible ISA PC system, a PnP compatible operating system (e.g., WINDOWS 95®) may assign the system resources to PnP ISA devices in the PC system. In such a PC system, the PnP ISA devices required for system boot become active by a ROM BIOS on power up using power up default system resources, while other PnP ISA devices not required for system boot come up inactive on power up. Next, a ROM BIOS of the PC system may be executed and the PC system will boot from its boot devices. Then, the PnP compatible operating system may be loaded. The operating system software is provided with support for PnP devices. In a similar manner to the PnP BIOS, the operating system will isolate each PnP device, assign a handle to each PnP device card, and read the resource data from that card. Once each card had been isolated, assigned a handle and read, the operating system software will arbitrate system resources for all PnP devices. Conflict-free resources may then be assigned and the devices activated. Finally, appropriate device drivers may be loaded and the system is thus configured.

Each above-described PnP software identifies and configures devices using a set of commands executed through three 8-bit I/O ports, that is, ADDRESS port, WRITE_DATA port, and READ_DATA port. The ADDRESS and WRITE_DATA ports are located at fixed addresses. The WRITE_DATA port is located at an address alias of the ADDRESS port. The READ_DATA port is re-locatable within the I/O range from 0x0203h to 0x03FFh (hexadecimal). This is the only readable auto-configuration port. A special sequence of data writes to one of the ports enables the logic on all the PnP cards in the PC system. This sequence is referred to as the initiation key.

All PnP cards respond to the same I/O port addresses. Consequently, the PnP software needs an isolation mechanism to address one particular card at a time. The isolation protocol uses a unique number built into each card called serial identifier to isolate one PnP card at a time. After isolation, the PnP software assigns each card a unique handle, called the Card Select Number (CSN), which is used to select that PnP card. Using a handle eliminates the need to use a more elaborate and time-consuming isolation protocol in order to select a unique card.

Each card supports a readable data structure that describes the resources supported and those requested by the functions on that card. The data structure supports the concept of multiple functions per ISA card. Each function is defined as a logical device. Plug and Play resource information is provided for each logical device, and each logical device is independently configured through the PnP standard registers of corresponding card. Following isolation, the PnP software reads the resource data structure on each card. When all resource capabilities and demands are known, a resource arbitration process is invoked to determine the resources allocation to each ISA card.

The configuration of ISA cards is performed using the command registers specified for each resource type. However, some ISA functions may not be re-configurable. In these situations, the resources requested will be equivalent to the resources supported. The resource data structure informs the arbiter that it cannot assign these resources to other PnP cards in the PC system. After the assignment of resources, an I/O conflict detection mechanism may be invoked. This mechanism provides a means to insure that I/O resources assigned are not in conflict with standard ISA cards. The command set also supports the ability to activate or deactivate the function(s) on the card. After configuration is completed, PnP cards are removed from configuration mode. The initiation key needs to be re-issued in order to re-enable configuration mode. The details of the Plug and Play logic flow and isolation process will be omitted herein for brevity's sake, and they can be found in the Plug and Play ISA specification.

Meanwhile, a technology closely related to PnP is Power Management. Many PC systems now use some type of power management (often called Advanced Power Management) to temporarily place the computer system in a suspend mode in which power is conserved. In such a system, when it has never been used for a predetermined time, the computer system goes into a suspend mode in which contents of all devices therein are stored in a non-volatile storage such as a hard disk drive and the entire system is substantially turned off for reducing power consumption. In this mode, the contents of all expansion devices are saved indefinitely until the system is resumed by, for example, turning the power switch on, pressing keyboard, or the like. If the system awakes from the suspend mode, a resume mode is entered. In the resume mode, the computer system retrieves the saved contents from the non-volatile storage in order to go back into the previous state that it was in before it entered the suspend mode. This power management scheme is most useful for portable computers using battery power in order to conserve power and prolong the life of the battery.

Typically, when a computer system using an advanced power is booted, either a resume boot process or a BIOS boot process is performed depending upon whether the system is in a resume mode. If the BIOS boot process is performed, an operating system is loaded and executed. After the operating system is executed or after the resume boot process is performed, the system enters a normal mode of operation.

For many PC systems using PnP incompatible operating systems (e.g., MS-DOS® and OS/2®) which do not support the PnP automatic configuration mechanism, the system BIOS may directly save and restore the PnP card information during suspend and resume modes. However, unlike PC systems using PnP incompatible operating systems, PC systems having PnP compatible operating system (e.g., WINDOWS 95®, or the like) and PnP ISA device cards, and employing such a power management scheme experience significant problems when the PC system enters into a suspend mode. The configuration of PnP ISA device cards is cleared when the PC system is powered off in a suspend mode. During a resume mode, the information of each PnP ISA device card needs restoring when the corresponding device driver receives the resume message from the BIOS through the operating system. However, most of the device drivers do not support this function. Further, in such a PnP compatible PC system, the system BIOS cannot find the address of the READ_DATA port since the PnP compatible operating system (specifically, WINDOWS 95®) directly configures the READ_DATA port of PnP ISA cards and does not re-configure the PnP cards. Thus, it is impossible for the system BIOS to save/restore the PnP ISA card information when the PC system is entering the suspend/resume mode, thereby disabling the PnP ISA cards after the system resume.

SUMMARY OF THE INVENTION

Accordingly, it is therefore an object of the present invention to provide a computer system having a true Plug and Play (PnP) capability to fully support an advanced power management scheme.

It is another object of the invention to provide a method of saving/restoring information of PnP ISA device cards in a computer system with a PnP compatible operating system and with an advanced power management system during a suspend/resume mode of the computer system.

These and other objects of the present invention can be achieved by a computer system with an advanced power management comprises a Plug and Play (PnP) compatible operating system; an industry standard architecture (ISA) bus; a non-volatile storage unit; at least one PnP ISA expansion device coupled to the ISA bus; and a basic input/output operating system (BIOS) for searching a read data port for the PnP expansion device to save/restore information of the PnP ISA expansion device into/from the non-volatile storage unit during a suspend/resume mode of the advanced power management.

According to another aspect of the present invention, there is provided a method for searching a read data port for PnP ISA cards in a computer system with a PnP compatible operating system and an advanced power management system, using serial identifier information of the PnP ISA device. The method comprises issuing an initiation key to place the expansion cards into a configuration mode when the operating system wishes to enter a suspend mode of the advanced power management; selecting one of the expansion cards installed in the computer system; setting an input/output address; reading resource configuration information having a vendor identifier, a serial number identifier, and a preset checksum of the vendor and serial number identifiers, using the input/output address; conducting a checksum for the vendor identifier and the serial number identifier, and comparing the resultant value of the conducted checksum with that of a preset checksum; determining whether two checksum values are equal to each other; when the two checksum values are equal to each other, confirming that the address of the read data port is the initial address; when the two checksum values are not equal to each other, changing the input/output address by a predetermined value, and determining whether the changed input/output address is beyond a predetermined range; and when the changed input/output address is not beyond the predetermined range, returning to reading the resource configuration information.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
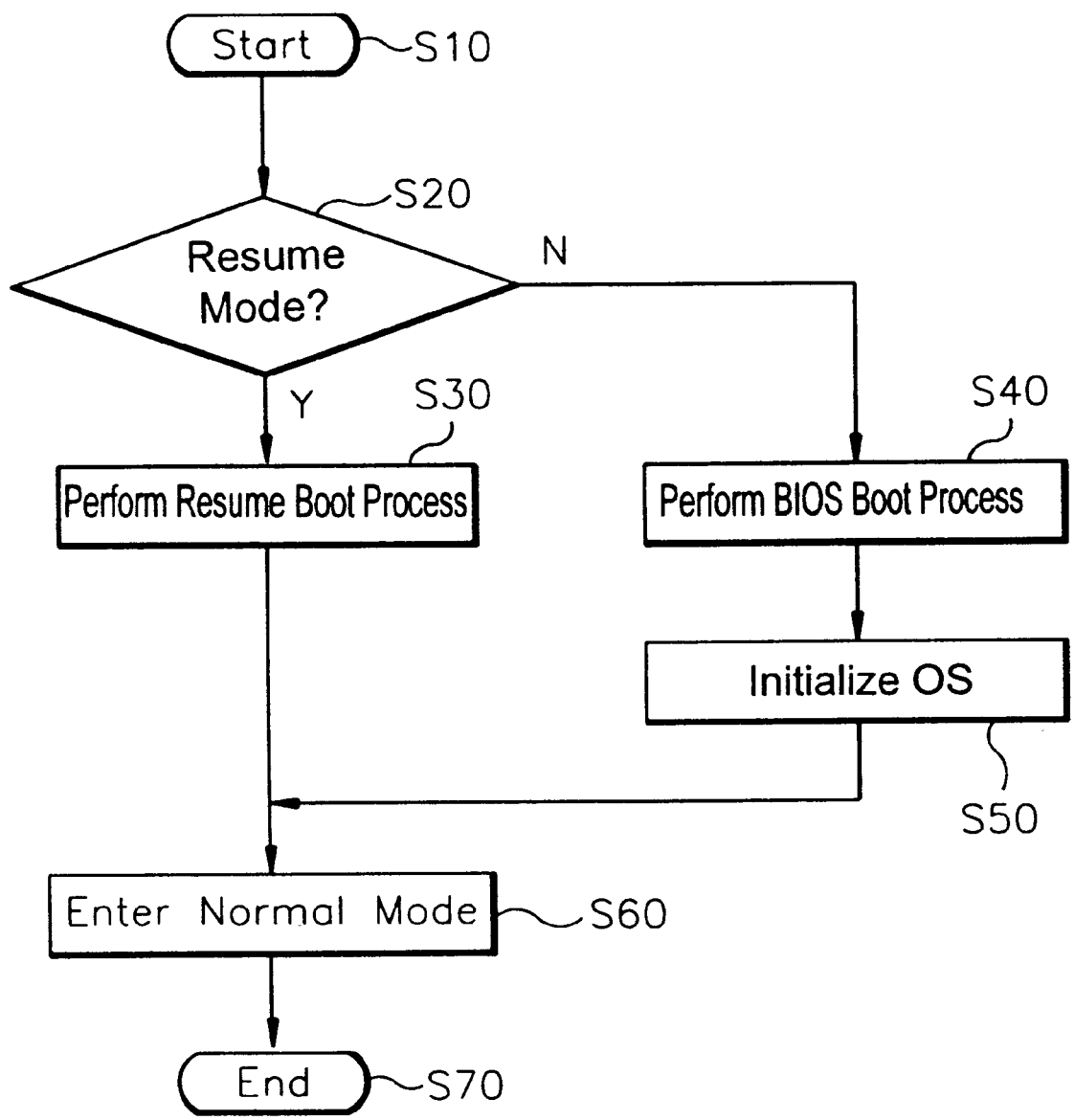
FIG. 1 is a simplified flow diagram illustrating a booting process of a computer system with an advanced power management.

Referring now to the drawings and particularly to FIG. 1, which illustrates a booting process of a typical computer system using an advanced power management. Referring to FIG. 1, from the start at step S10, it is checked whether the system will enter a resume mode at step S20. If the system is in a resume mode, the resume boot process is performed at step S30. If the system is not in a resume mode, the BIOS boot process is performed at step S40, and then an operating system is loaded and executed at step S50. After either step S30 or step S50, the system is in a normal mode of operation at step S60.

However, unlike PC systems using PnP incompatible operating systems, PC systems having PnP compatible operating system (e.g., WINDOWS 95®, or the like) and PnP ISA device cards, and employing such a power management scheme experience significant problems when the PC system enters into a suspend mode. The configuration of PnP ISA device cards is cleared when the PC system is powered off in a suspend mode. During a resume mode, the information of each PnP ISA device card needs restoring when the corresponding device driver receives the resume message from the BIOS through the operating system. However, most of the device drivers do not support this function. Further, in such a PnP compatible PC system, the system BIOS cannot find the address of the READ_DATA port since the PnP compatible operating system (specifically, WINDOWS 95®) directly configures the READ_DATA port of PnP ISA cards and does not re-configure the PnP cards. Thus, it is impossible for the system BIOS to save/restore the PnP ISA card information when the PC system is entering the suspend/resume mode, thereby disabling the PnP ISA cards after the system resume.

Figure 2:
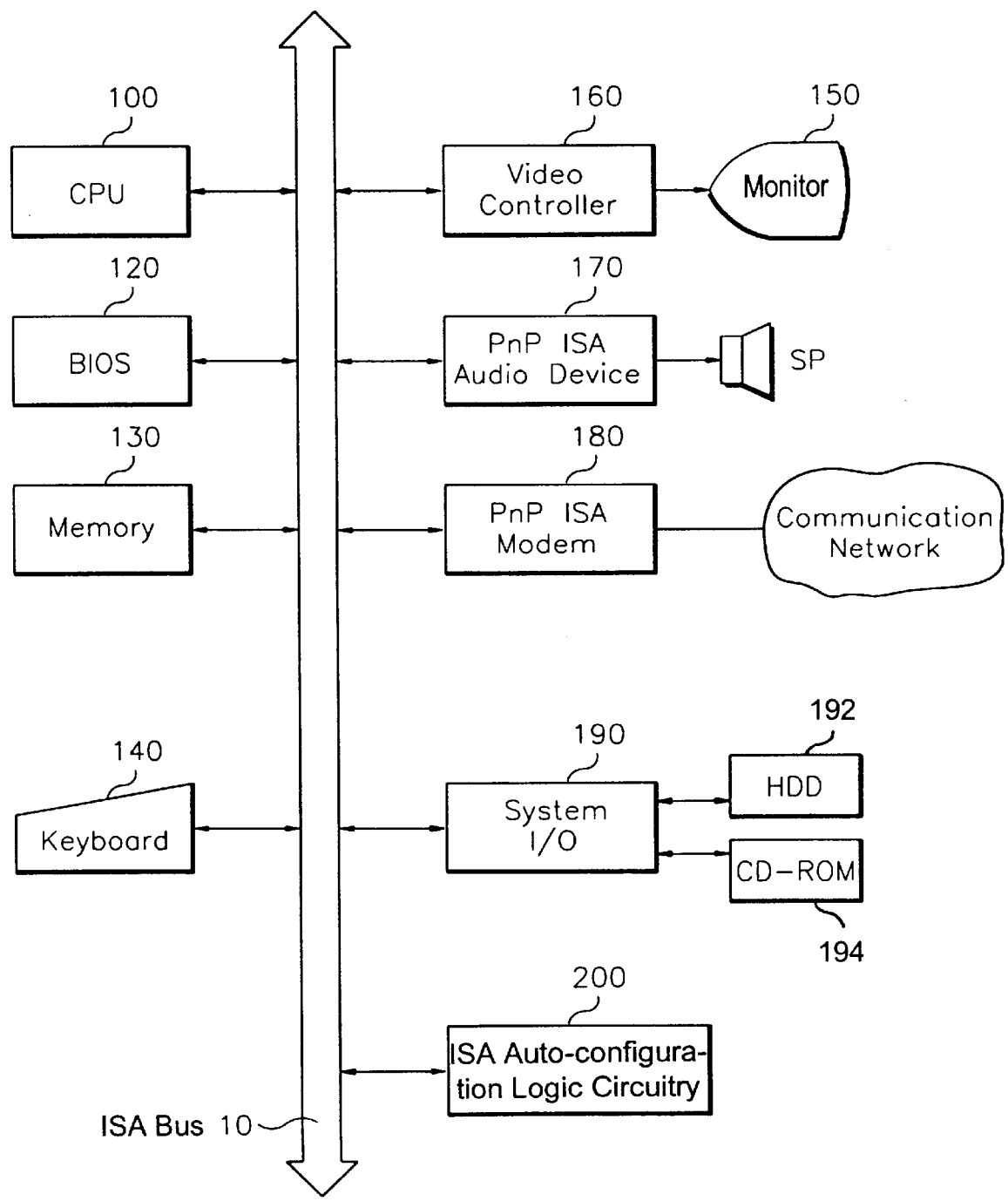
FIG. 2 is a simplified block diagram illustrating a computer system for implementing a Plug and Play ISA read data port search mechanism according to principles of the present invention.

Turning now to FIG. 2, which illustrates a computer system implementing the PnP ISA read data port search mechanism constructed according to the principles of the present invention. The computer system includes an ISA bus 10, a central processing unit (CPU) 100, a PnP compatible operating system 110 such as WINDOWS 95® or the like, either a PnP system BIOS or a non-PnP system BIOS 120, a memory unit 130, and keyboard and its controller 140. The computer system further includes a display monitor 150, a PnP ISA video controller 160, a PnP ISA audio device card (e.g., Soundblaster® or the like) 170, PnP ISA modem device card 180, a PnP system I/O controller 190 for controlling a hard disk drive (HDD) 192 and/or a compact disk read-only-memory drive (CD-ROM) 194, and an ISA auto-configuration logic circuitry 200.

Figure 3:
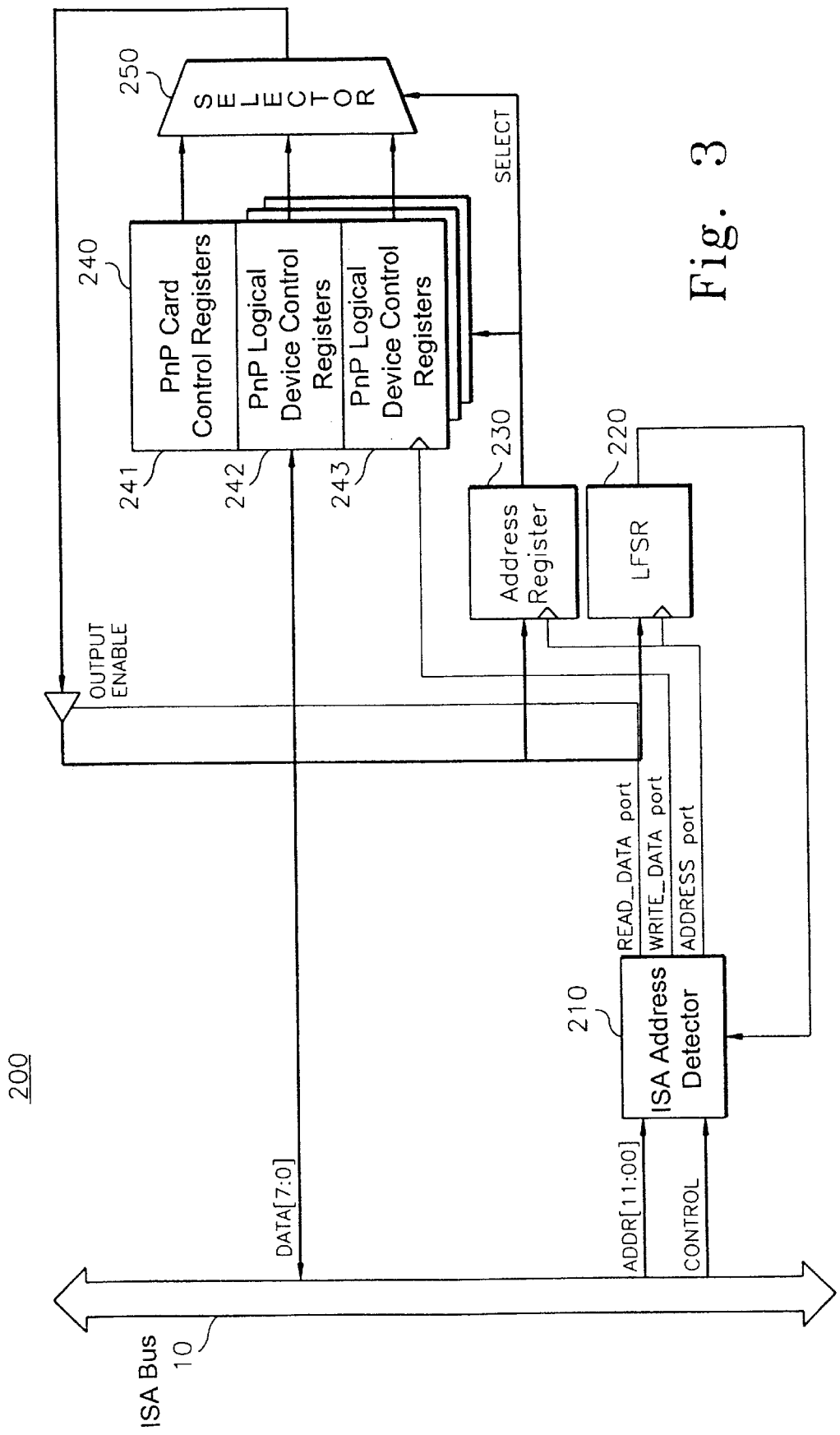
FIG. 3 is a functional block diagram of the ISA auto-configuration logic circuitry of FIG. 2.

FIG. 3 is a functional block diagram of the ISA auto-configuration logic circuitry 200 of the computer system shown in FIG. 2. Referring to FIG. 3, the ISA auto-configuration logic circuitry 200 includes an ISA address decoder 210 connected to the ISA bus 10, a linear feedback shift register (LFSR) 220, an address register 230, PnP standard registers 240, and a selector 250.

The 12-bit ISA address decoder 210 generates ADDRESS port, WRITE_DATA port and READ_DATA port signals. The ADDRESS and WRITE_DATA ports are located at fixed addresses 0x279h and 0xA79h (hexadecimal), respectively. The WRITE$_{13}$ DATA port is located at an address alias of the ADDRESS port. The READ_DATA port is re-locatable within the I/O address range from 0x0203h to 0x03FFh. This is the only readable auto-configuration port. In the ADDRESS Port, the PnP standard registers 240 are accessed by writing the address of the desired register to the ADDRESS port, followed by a read of data from the READ_DATA port or a write of data to the WRITE_DATA port. A write to the ADDRESS port may be followed by any number of WRITE_DATA or READ_DATA accesses to the same register location without the need to write to the ADDRESS port before each access. The ADDRESS port is also the write destination of the initiation key. The WRITE_DATA port is used to write information to the PnP standard registers 240. The destination of the data is determined by the last setting of the ADDRESS port. The READ_DATA port is used to read information from the PnP standard registers 240. The source of the data is determined by the last setting of the ADDRESS port. The address of the READ_DATA port is set by writing the proper value to a PnP control register. The isolation protocol verifies that the location selected for the READ_DATA port is free of conflict.

In accordance with the proposal of the PnP ISA specification Version 1.0a (May 5, Dec. 10, 1994), all PnP device cards used in the computer system of this embodiment have four PnP card states, that is, Wait for Key, Sleep, Isolation, and Config states. After a power-up reset, or in response to the Reset and Wait for Key commands, all cards enter the Wait for Key state. No commands are active in this state until the initiation key is detected on the ISA bus 10. This state is the default state for PnP cards during normal system operation. After configuration and activation, PnP software return all cards to this state.

In the sleep state, PnP cards wait for a Wake command which selectively enable one or more cards to enter either the Isolation state or the Config state based on the write data and the value of the Card Select Number (CSN) on each card. Cards leave the Sleep state in response to a Wake command when the value of write data bits [7:0] of the Wake command matches the card's CSN. If the write data for the Wake command is zero then all cards that have not been assigned a CSN enters the Isolation state. If the write data for the Wake command is not zero then the one card whose assigned CSN matches the parameter of the Wake command enters the Config state.

In the Isolation state, PnP cards respond to reads of the Serial Isolation register. Once a card isolated, a unique CSN is assigned. This number will later be used by the Wake command to select the card. Once the CSN is written, the card transitions to the Config state. In the Config state, a card in the Config state responds to all configuration commands including reading the card's resource configuration information and programming the card's resource selections. Only one card may be in this state at a time.

Refer back to FIG. 3, the LFSR 220 generates data patterns needed to provide an initiation key protocol and to provide a checksum verification during serial data read in the isolation protocol. The LFSR 220 is an 8-bit shift register that resets to the value 0x6Ah. The initiation key is sent to the PnP cards in the Wait for Key state by insuring that the LFSR is in its initial state, then performing 32 writes to the ADDRESS port. The 32 writes are exactly equal to the 32 values the LFSR will generate starting from 0x6Ah. The LFSR will reset to its initial state (0x6Ah) any time the PnP card is in the Wait for Key state and receives a write to the ADDRESS port that does not match the value currently in the LFSR 220. To insure that the LFSR 220 is in the initial state, two write operations of value 0x00h to the ADDRESS port are performed before sending the initiation key. The checksum algorithm uses the same LFSR 220 as is in the initiation key process. The LFSR 220 resets to 0x6Ah upon receipt of the Wake command.

The PnP standard registers 240 includes PnP card control registers 241, PnP logical device control registers 242, and PnP logical device configuration registers 243. The card control registers 241 are used for global functions that control the entire card. The logical device control registers 242 control device function such as enabling the device onto the ISA bus 10. The logical device configuration registers 243 are used to program the device's ISA bus resource use.

As the card control registers 241, there are Set RD_DATA, Serial Isolation, Config Control, Wake, Resource Data, Status, Card Select Number, and Logical Device Number registers whose address port values are 0x00h, 0x01h, . . . , 0x07h in this order, respectively (i.e., these registers are numbered 0x00h to 0x07h). Writing to the Set RD_DATA register (0x00h) modifies the address of the read data port used for reading from PnP ISA cards. Bits [7:0] become I/O read port address bits [9:2]. Reads from this register are ignored, i.e., this register is a write-only register. A read to the Serial Isolation register (0x01h) causes PnP cards in the Isolation state to compare one bit of the board ID. This register is a read-only register. A write to bit [0] of the Config Control register (0x02h) performs a reset function on all logical devices. This resets the contents of configuration registers to their default state. All card's logical devices enter the Wait for Key state but all CSNs are preserved and logical devices are not affected. A write to bit [2] of this register causes all cards to reset their CSN to zero. This register is a write-only register. The values are not sticky, that is, hardware will automatically clear from them and there is no need for software to clear the bits. A write to the Wake register (0x03h) causes all cards that have a CSN that matches the write data [7:0] to go from the Sleep state to the either the Isolation state if the write data for this command is zero or the Config state if the write data is not zero. This register is a write-only register.

A read from the Resource Data register (0x04h) reads the next byte of resource information. The Status register (0x05h) is polled until bit [0] is set before this register is read. The Resource Data register is a read-only register. Once bit [0] of the Status register is set, it is indicated that it is okay to read the next data byte from the Resource Data register. The Status register is a read-only register. A write to the Card Select Number register (0x06h) sets a card's CSN. The CSN is a value uniquely assigned to each ISA card after the serial identification process so that each card is individually selected during a Wake command. This register is readable and writable. The Logic Device Number register (0x07h) selects the current logical device. All reads and writes of memory, I/O, interrupt and DMA configuration information access the registers of the logical device written here. This register is readable and writable.

Although not shown in FIG. 3, there are Card Level#1 registers (0x08h–0x1Fh) and Card Level#2 registers (0x20h–0x2Fh) which are also the card control registers. The Card Level#1 registers (0x08h–0x1Fh) are reserved for future use. The Card Level#2 registers (0x20h–0x2Fh) are vendor defined registers, which allow vendors to configure non-standard ISA resources through the PnP mechanism. These card control registers 241 are unique for each ISA card. However, it should be noted that the logical device control registers 242 and the logical device configuration registers 243 are repeated for each logical device on the card.

The logical device control registers 242 includes an Activate register, an I/O Range Check register, and several reserved and vendor-defined registers. The logical device control registers includes Memory configuration registers, I/O configuration registers, Interrupt configuration registers, Reserved configuration registers, and Vendor-defined configuration registers.

PnP cards return read-only configuration information in two formats. The serial identifier is returned bit-wise by the PnP devices in response to reads from the Serial Isolation register. This information is returned in a serial format to facilitate the PnP device selection algorithm. PnP cards also provide resource data sequentially a byte at a time in response to reads from the Resource Data register. The resource configuration data completely describes all resource needs and options of the device.

Figure 4:
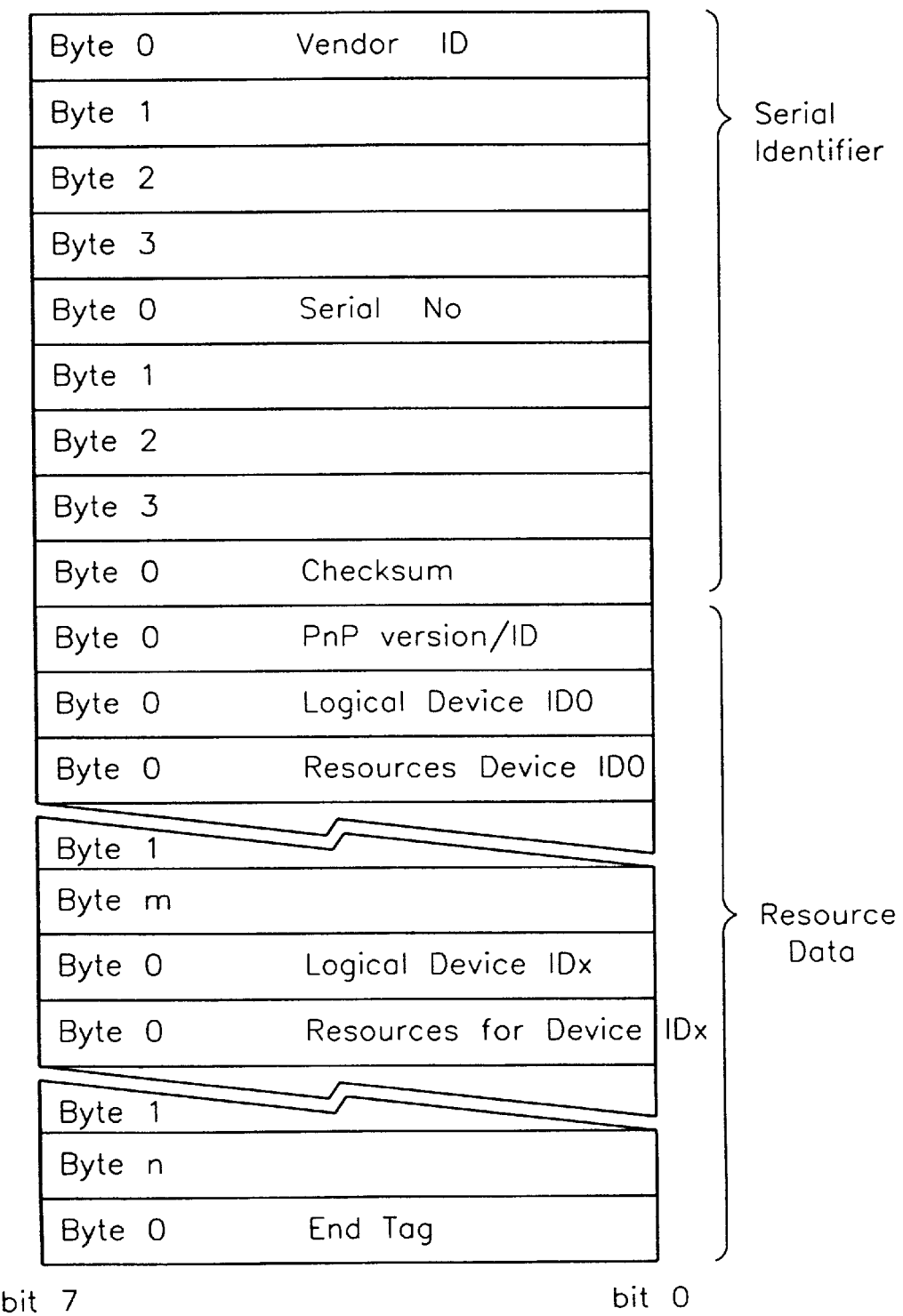
FIG. 4 is a diagram illustrating the serial identifier and resource data format.

FIG. 4 illustrates a serial identifier and resource data format. The serial identifier is a 72-bit unique number composed of two 32-bit fields and an 8-bit field. The first 32-bit field is a vendor identifier. The purpose of this field is to serve as a unique board identifier that allows PnP card selection through the isolation algorithm. The other 32-bit field can have any value, for example, a serial number, part of a LAN address, or a static number, as long as there will never be two cards in a single system with the same 64 bit number. This field must be unique in order to support multiple cards with the same vendor identifier in one system. The 8-bit field is a checksum field which is used to ensure that no conflicts have occurred while reading the device identifier information. Data patterns needed for checksum verification are generated by the LFSR.

The PnP resource data fully describes all resource requirements of a PnP ISA card as well as resource programmability and interdependencies. PnP resource data is supplied as a series of tagged data structures. To minimize the amount of storage needed on PnP ISA cards tow different data types are supported. These are called small items and large items. Generally, a small resource data type is 2–8 bytes in size, but a large data type is 16 bits-64 Kbytes. The first byte defines the type and size for most information and is followed by one or more bytes of the actual information. Bit [7] of the first byte is used as the tag identifier to differentiate between a small item or a large item data type.

The PnP version identifier number identifies the version of the PnP specification with which this card is compatible. The logical device identifier provides a mechanism for uniquely identifying multiple logical devices embedded in a single physical board. This identifier's format is identical to that of the vendor identifier. This identifier is used to select a device driver for the device.

Figure 5:
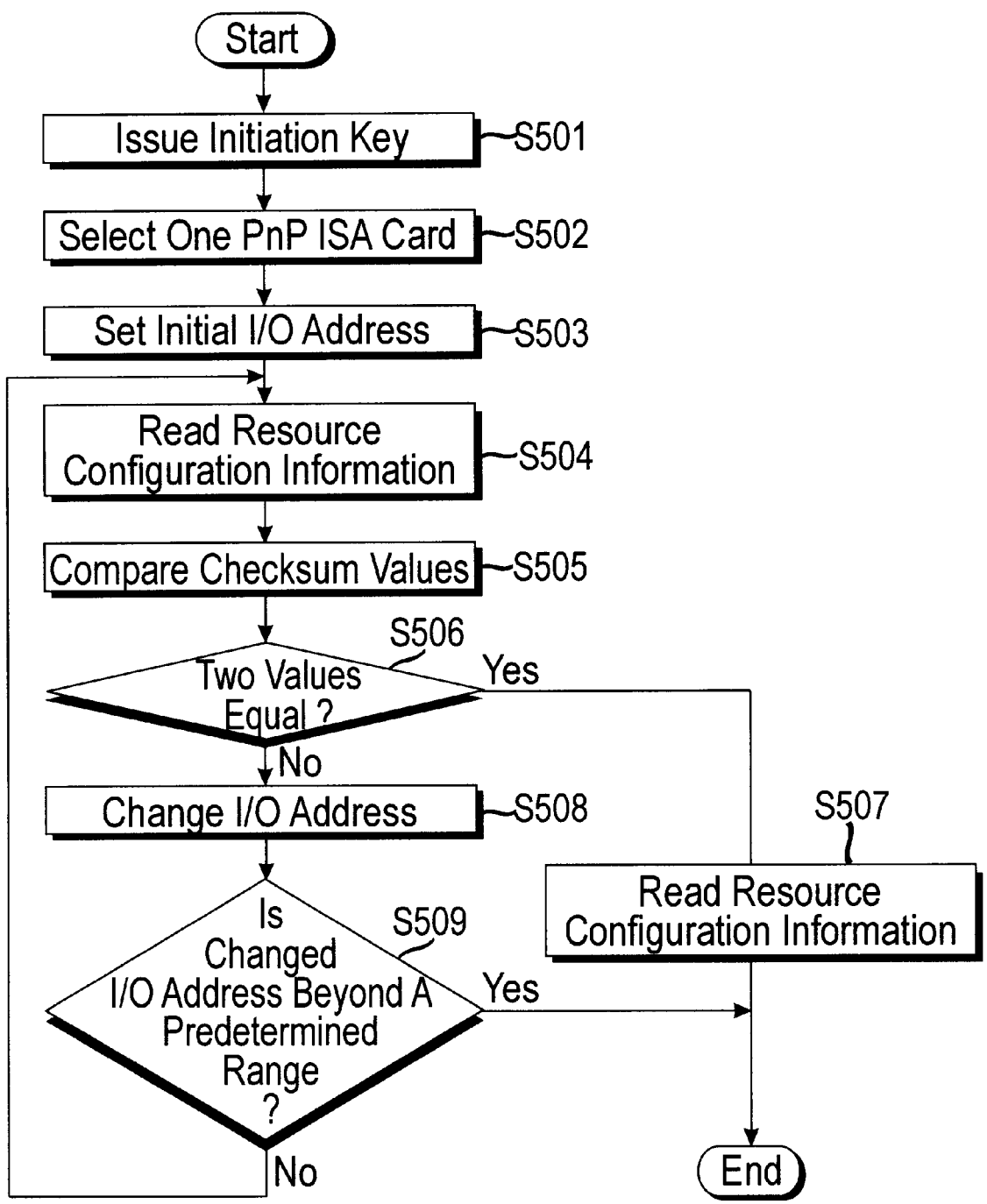
FIG. 5 is a flow diagram of a novel method for saving/restoring PnP ISA device resource information in a computer system according to the principles of the present invention.

In order to solve the problem arising in a conventional PC system having PnP compatible operating system (e.g., WINDOWS 95®, or the like) and PnP ISA device cards, and employing an advanced power management scheme when the PC system enters into suspend mode, a novel method for saving/restoring PnP ISA device resource information in a computer system during the suspend/resume mode will be described with reference to FIG. 5 hereinbelow. The method is realized by system ROM BIOS 120.

In step S501, the BIOS system 120 issues 32 byte Initiation Key in order to place PnP logic devices into a configuration mode when the PnP compatible operating system (e.g., WINDOWS 95®, or the like) informs the BIOS that the operating system wishes to enter a suspend mode. The Initiation Key is written into the card control register 0x02h (i.e., Config control register) of each PnP ISA card. Then, the BIOS writes '1' into the card control register 0x03h (i.e., Wake register) so as to select one PnP ISA card which will be placed into the Config state at step S502.

In step S503, the BIOS set a predetermined I/O address (e.g., 0x0203h) to the card control register 0x00h (i.e., Set RD_DATA register) in order to identify whether the read data port address is identical to the initial I/O address. In step 504, the BIOS then reads 72 bit serial identifier and resource data information through the card control register 0x04h (i.e., Resource Data register). In step S505, the BIOS conducts checksum for initial 8 bytes (i.e., 32 bit vendor identifier and 32 bit serial number identifier) and compares the resultant value of the conducted checksum with that of the preset checksum field (ninth byte) subsequent to the initial 8 bytes fields.

In step 506, the BIOS determines whether two checksum values are equal to each other. If the two checksum value are equal to each other, the BIOS recognizes the existence of a PnP ISA card and confirms that the address of the read data port is the initial I/O address (i.e., 0x0203h) at step S507. Thus, the BIOS can save PnP ISA device resource configuration information of the ISA card during the suspend mode and restore the ISA card's information during the resume mode, regardless of whether or not corresponding ISA device driver has PnP compatibility. Then, the process for searching the read data port for PnP ISA cards. If the two checksum values are not equal to each other at step S506, the BIOS changes the I/O address by a predetennined value (e.g., 4h) which corresponds to an offset value between I/O port addresses at step S508. For example, in case the initial I/O address was set to 0x0203h, the I/O address will be increased. On the other hand, in case the initial I/O address was set to 0x03FFh, the I/O address will be decreased. In step S509, the BIOS determines whether the changed I/O address is beyond the range from 0x0203 to 0x03FFh. If not, flow goes back to the step S504, but, if so, the process for searching the read data port is terminated.

As described above, according to this invention, a computer system with PnP compatible operating system and with PnP ISA device cards is able to save/restore the resource configuration information of the PnP ISA devices into/from a non-volatile storage unit by use of the searched read data port during a suspend/resume mode of an advanced power management.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system with an advanced power management, comprising:

an industry standard architecture (ISA) bus;

a non-volatile memory;

at least one PnP ISA expansion device coupled to the ISA bus; and a basic input/output operating system (BIOS) for searching a read data port for said PnP expansion device to save information of said PnP ISA expansion device into said non-volatile memory during a suspend mode of the advanced power management, and to restore information of said PnP ISA expansion device from said non-volatile memory during a resume mode of the advanced power management.

2. The computer system of claim 1, further comprised of said basic input/output operating system (BIOS) searching the read data port for said PnP expansion device using serial identifier information of said PnP ISA expansion device.

3. The computer system of claim 1, further comprising an industrial standard architecture automatic configuration device connected to the ISA bus for the automatic configuration of the PnP ISA expansion card installed therein.

4. The computer system of claim 3, further comprised of said basic input/output operating system (BIOS) searching the read data port for said PnP ISA expansion card installed in the computer system by:

issuing an initiation key to place the PnP expansion card into a configuration mode when the system wishes to enter said suspend mode of the advanced power management;

selecting said PnP ISA expansion card;

setting an input/output address;

reading resource configuration information having a vendor identifier, a serial number identifier, and a preset checksum of the vendor and serial number identifiers, using the input/output address;

conducting a checksum for the vendor identifier and the serial number identifier, and comparing the resultant value of the conducted checksum with that of a preset checksum;

determining whether two checksum values are equal to each other;

when the two checksum values are equal to each other, confirming that the address of the read data port is the initial address;

when the two checksum values are not equal to each other, changing the input/output address by a predetermined value, and determining whether the changed input/output address is beyond a predetermined range; and when the changed input/output address is not beyond said predetermined range, returning to reading said resource configuration information.

5. A method for searching a read data port for expansion cards installed in a computer system with a Plug and Play (PnP) compatible operating system and an advanced power management system, comprising the steps of:

issuing an initiation key to place the expansion cards into a configuration mode when the operating system wishes to enter a suspend mode of the advanced power management;

selecting one of the expansion cards installed in the computer system;

setting an input/output address;

reading resource configuration information having a vendor identifier, a serial number identifier, and a preset checksum of the vendor and serial number identifiers, using the input/output address;

conducting a checksum for the vendor identifier and the serial number identifier, and comparing the resultant value of the conducted checksum with that of a preset checksum;

determining whether two checksum values are equal to each other;

when the two checksum values are equal to each other, confirming that the address of the read data port is the initial address;

when the two checksum values are not equal to each other, changing the input/output address by a predetermined value, and determining whether the changed input/output address is beyond a predetermined range; and when the changed input/output address is not beyond said predetermined range, returning to reading said resource configuration information.

* * * * *